United States Patent [19]

Wojtkowski et al.

[11] Patent Number: 5,163,273

[45] Date of Patent: Nov. 17, 1992

[54] AUTOMATIC LAWN MOWER VEHICLE

[76] Inventors: David J. Wojtkowski, 593 Lakeway Dr., Pittsfield, Mass. 01201; Leon W. Hubby, 103 Eulalah La., Buda, Tex. 78610

[21] Appl. No.: 678,009

[22] Filed: Apr. 1, 1991

[51] Int. Cl.⁵ .................... A01D 34/64; A01D 34/78
[52] U.S. Cl. ................................ 56/11.9; 56/15.4; 180/65.1; 180/211
[58] Field of Search ............. 56/11.9, 14.7, 15.4, 56/15.6, 16.7, DIG. 9, DIG. 14; 180/65.1, 252, 253, 211

[56] References Cited

U.S. PATENT DOCUMENTS

| | | | |
|---|---|---|---|
| 2,957,294 | 10/1960 | Hallenbeck | 56/15.4 |
| 3,112,594 | 12/1963 | Hallenbeck | 180/211 X |
| 3,550,714 | 12/1970 | Bellinger | 180/79.1 |
| 3,738,440 | 6/1973 | Storm | 180/13 |
| 4,084,395 | 4/1978 | Nannen | 180/211 X |
| 4,530,056 | 7/1985 | MacKinnon et al. | 180/168 X |

*Primary Examiner*—David J. Bagnell
*Attorney, Agent, or Firm*—Arthur K. Hooks

[57] ABSTRACT

An automatic lawn mower vehicle is of a tricycle construction having a forward drive-wheel assembly including a drive wheel and a drive-wheel motor, and having a trailing sulky connected at a sulky hitch end by a vertical hinge to the forward drive-wheel assembly. Steering is accomplished by a motor mounted to the drive-wheel assembly and through a gear reduction system connected to the sulky part of the vertical hinge. A plurality of grass cutters are mounted directly to the drive-wheel assembly for cutting in a horizontal plane however the vehicle may be turning. The outermost two cutters are equidistant from the drive wheel and are centered in the vertical plane of the drive-wheel axle. The grass cutting wake produced by this machine is always equally wide on both sides of any point in the path of the drive wheel, so that the predetermined drive-wheel path, e.g. when the mower vehicle is automated to follow a buried wire, is very simple to pre-construct so that the cutting more exactly follows the lawn boundaries and structures in the lawn. A tippable shroud encompasses and protects the drive-wheel assembly and cutters. When the shroud is displaced and tipped by an article or child in the lawn, the mower vehicle is stopped by a shroud-tipping sensor connected to the drive-wheel motor controller. The same sensor also shuts off the power to the cutters.

12 Claims, 3 Drawing Sheets

AUTOMATIC LAWN MOWER VEHICLE

BACKGROUND

The present invention relates to a lawn mower vehicle having a unitary drive-wheel assembly including just one DC motor driven support wheel, a trailing sulky and a vertical hinge connecting the trailing sulky to the drive-wheel assembly, so as to be especially suitable for use as an automatic robot-like lawn mower.

Many types of lawn mowers have been proposed in the past. For example, two are known that have an electric drive-wheel motor, two steering drive wheels and two idling wheels behind, all built on one chassis. Another vehicle, not a lawn mower, employs a forward drive assembly including one drive wheel and a gasoline engine. Like other tricycles in the art, it has a two-wheel trailer connected by a tilted post and bearing hinge.

The single unit lawn mowers of the prior art have one or more cutters mounted on the same chassis as are all the supporting wheels and are not capable of cutting a swath or wake of cut grass that remains centered about the path of the drive wheel. The path is always skewed toward the inside of each turn of vehicle redirection.

It is an object of the present invention to provide a single-drive wheel lawn mower vehicle capable of cutting a wake of cut grass that is always symmetrical about the path of the drive wheel.

SUMMARY OF THE INVENTION

An automatic mower vehicle is comprised of a drive-wheel assembly, a trailing sulky carrying an electrical power source, and a hinge having a vertical axis. The hinge has one part and another part hingedly connected to each other. The one hinge part is fastened to the drive-wheel assembly while the another hinge part is attached to the trailing sulky at a hitch end thereof. The drive-wheel assembly has fixedly mounted thereto a single drive wheel that alone supports this assembly on the ground. The drive wheel is positioned directly below the hinge and is driven by an electrical drive-wheel motor that is also mounted to the drive-wheel assembly. A grass cutter is also mounted to the drive-wheel assembly. The one hinge part is preferably a cylindrical bearing and the another hinge part is a cylindrical post fitted inside the bearing.

The above combination of mechanical features is uniquely well suited for allowing the placement of a plurality of cutters about the drive wheel that maintain a fixed position relative to the drive wheel even when the drive-wheel assembly and thus the drive wheel itself turns with respect to the trailing sulky. For example, in a preferred arrangement of cutters, a pair of cutters are positioned equi-distant from the central plane of the drive-wheel and one and the opposite sides respectively of the drive wheel while other cutters in combination with the pair of cutters all have overlapping areas of cut to form a combined cutting area that is an arc of more than 180 degrees. With this cutter arrangement, the cut grass wake produced behind the moving mower vehicle is always equally wide from any point in the path of the drive wheel however the vehicle may have been turning. This feature renders the mower vehicle of this invention especially suitable for use as a completely automatic guided-path mower, e.g. one that follows a continuous wire buried a few inches under the ground patterned to guide the mower along many parallel paths for cutting a lawn, whereby the "rules" for guiding along many straight and turning mutually parallel paths becomes greatly simplified, namely all paths everywhere will be equi-distant from the adjacent paths.

Perhaps even more significant however is that the turning radius as measured by the tightest radius of the cut grass wake that the mower vehicle of this invention is inherently capable of making is much smaller than that of mower machines of the prior art wherein there is no provision or even possibility to mount the outer most cutters laterally of the point at which the steered drive wheel touches the ground, i.e. in the vertical plane of the drive-wheel axle.

In another aspect of the invention, a hard-shell shroud covers and protects the drive-wheel assembly. The shroud is mounted to the bearing part of the hinge by a tip ring assembly permitting tipping of the shroud, e.g. when it is hit by an object in the lawn. A tipping sensor detects tipping of the shroud of a certain minimum amount and via a motor controller, disconnects and stops the drive-wheel motor and cutter motors until an operator starts them again by actuating the start switch.

In yet another aspect of the invention, the load current of at least one cutting motor is sensed, which load current is a measure of the physical loading of the corresponding cutter or cutters. The motor controller adjusts the sped of the drive-wheel motor inversely with the cutter motor load current. Thus, for example when high or tough grass is encountered, the mower vehicle slows to keep the cutter speed at an optimally efficient level.

DESCRIPTION OF THE PREFERRED EMBODIMENTS

Figure 1:
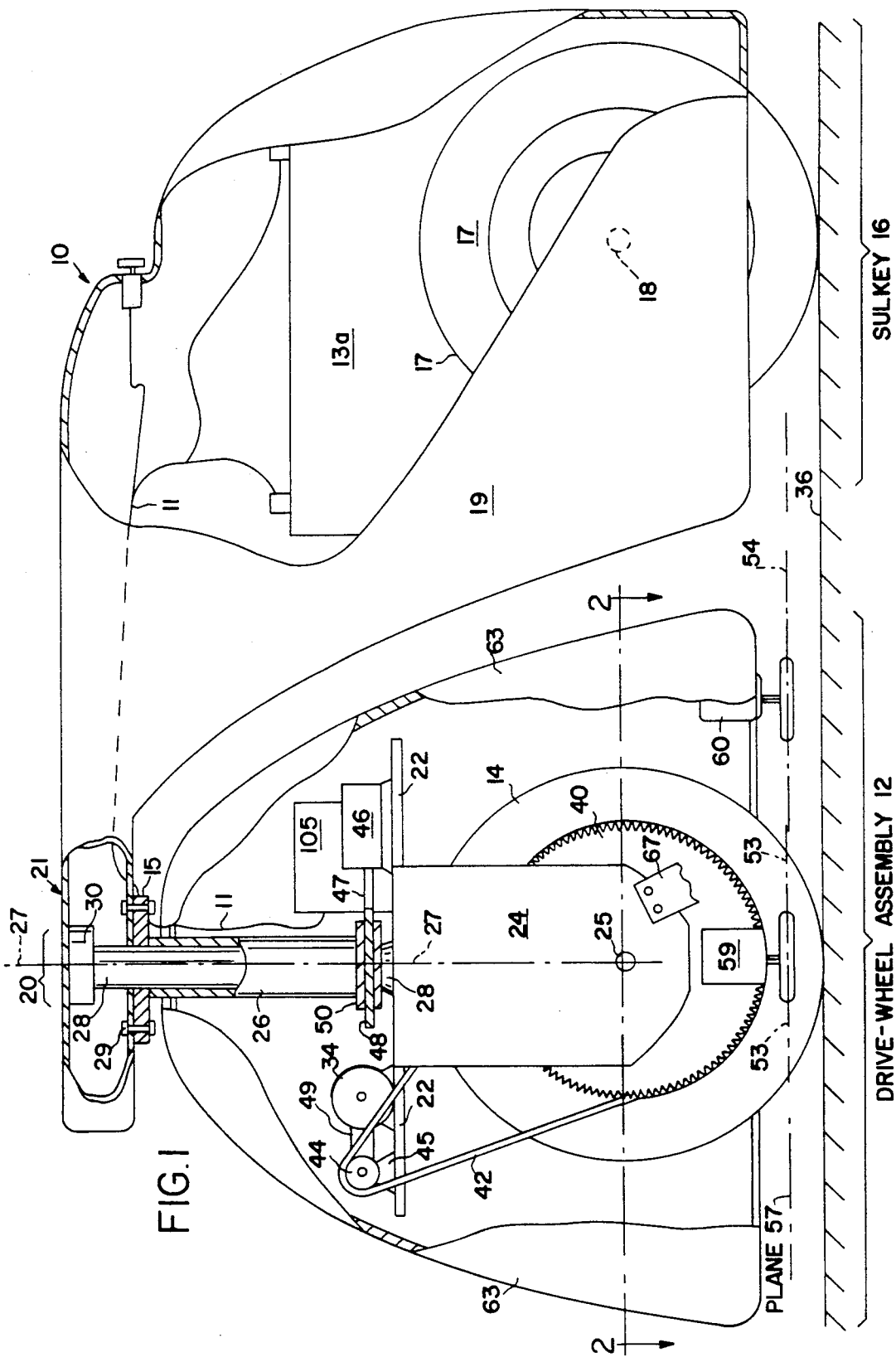
FIG. 1 shows in side view a lawn mower vehicle of this invention with body shrouds partly removed.

The tricycle vehicle 10 depicted in FIG. 1 includes a drive assembly 12 having one supporting wheel, namely the drive wheel 14. A trailing sulky 16 is connected by a hinge 20 to the drive assembly 12. The sulky 16 has two supporting wheels 17 which are mounted by axle 18 equi-distant and on opposite sides of the plane of the drive-wheel 14 when the vehicle 10 is headed in a straight line. The battery 13a is carried by the sulky 16 and is connected by electrical cables 11 for powering the drive wheel 14 and other components described below. An outer shell covers the sulky 16 and serves as the sulky shroud 19.

The drive assembly 12 includes a drive-wheel base 22 that in the preferred embodiment is a horizontal plate or deck. Extending downwardly from the wheel-base 22 and fixedly connected thereto is a drive-wheel support fork 24. The drive wheel 14 is positioned between the two tines of the fork 24 mounted thereto by the horizontal axle 25.

The hinge 20 is comprised of a long main bearing 26 that is vertical and fixedly connected via welds 23 to a sulky support plate 15 and thence to the hitch end 21 of the sulky 16 via bolts 29, as seen in FIG. 1. Hinge 20 is further comprised of a post or shaft 28 which is welded to the wheel-base plate 22 and is thus a fixed integral part of the drive assembly 12. The shaft 28 is stopped from passing through the main bearing 26 by a thrust bearing 30 that is mounted in a forward portion 21 of the sulky 16. The vertical axis 27 of the hinge 20 passes symmetrically through the drive wheel 14 itself to enable steering of the vehicle 10 by turning the drive assembly 12 relative to the trailing sulky 16. The long main bearing 26 and shaft 28 have commensurate lengths, e.g. about 30 cm. The long hinge 20 permits steering, keeps the drive assembly 12 vertical, and serves as a support for the forward end 21 of the sulky 16 as well as the pivotable means for towing the trailing sulky 16. The tricycle mower vehicle 10 is thus composed of a tandem connected articulated drive-wheel assembly 12 and trailing sulky 16.

The vehicle 10 is propelled along the supporting ground 36 by powering drive wheel 14. This is accomplished by an electric motor 34 that is mounted to the drive-wheel base. Motor 34 is connected to the drive wheel via a turnable mechanical linkage including a large diameter fine toothed gear 40 mounted coaxially and fixedly to the drive wheel 14.

A flexible drive chain 42 engages the gear 40 and a smaller diameter fine toothed gear 44 that is in turn driven by the idler pulley's unit 45, and belt 49 that is connected to the drive motor 34.

Steering of the tricycle vehicle 10 is effected by the electrical steering motor 46 that is mounted fixedly to the drive-wheel base 22. The shaft 47 of the steering motor 46 is connected to a worm gear 48 that engages a cog gear 50 which is in turn coaxially mounted about a lower portion of the bearing 26 of hinge 20. the shaft 47 of the steering motor 46 is thus turnably connected to the lower portion of the bearing 26 and of course also to the drive-wheel base plate 22, and the term "turnably" is thereby defined as it is used herein. Since the bearing 26 is firmly fixed to the sulky 16, when the motor is energized the entire drive-wheel assembly 12 is caused to turn about the vertical axis of hinge 20 with respect to the sulky 16.

Alternatively, the steering motor may be fixedly mounted to the main bearing 26 and the shaft of the steering motor mechanically coupled to a gear that is mounted directly to the base plate 22. More generally, the body of the steering motor and the steering motor shaft are fixedly connected respectively to the main bearing 26 and the hinge-post 28, so that when the motor is running the hinge-post 28 is caused to turn relative to the bearing 26. This in turn is equivalent to rotating the drive-wheel assembly 12 with respect to the sulky 16.

In another alternate construction, the steering motor may be located either in the drive-wheel assembly 12 or the hitch end 21 of the sulky 16. In the later case, the body of the steering motor 46 may be mounted to the sulky-hitch end 21 with it drive-shaft 47 turnably connected to the shaft 28 of the hinge 20.

Figure 2:
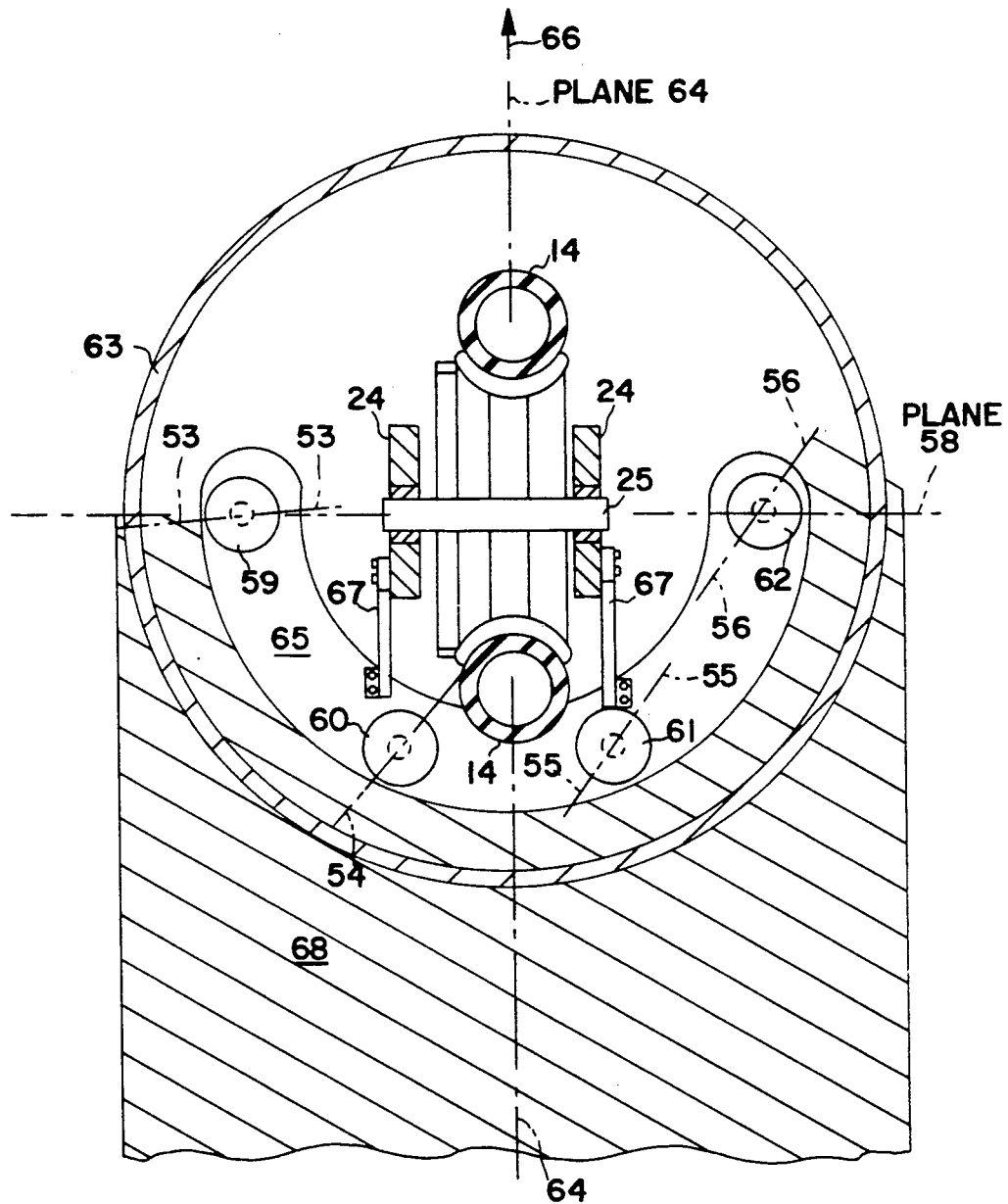
FIG. 2 shows in top sectional view the drive wheel assembly of the mower vehicle of FIG. 1 taken in plane 2—2.

With reference to FIG. 1 and 2, grass mowing is accomplished by vehicle 10 employing four separate essentially identical cutters 53, 54, 55 and 56. These cutters are preferably comprised of lengths of a tough plastic cord such as that commonly used in hand held grass trimmers or whips. All four cutters rotate in the horizontal cutting plane 57 that is about parallel to and spaced away from the supporting ground 36 by a few inches. Each of the cutters 53, 54, 55 and 56 is mounted about the shafts of the respective electrical motors 59, 60, 61 and 62.

The laterally outermost two motor/cutter sub assemblies 59/53 and 62/56 are positioned symmetrically on either side of the drive wheel 14 and drive-wheel plane 64, and are about centered in the vertical plane 58 of the drive-wheel axle 25.

The two motor-cutter sub assemblies 60/54 and 61/55 are also mounted symmetrically about the plane 64, and trail the vertical drive-wheel-axle plane 58. All four motor-cutter sub assemblies are supported by the semi-circular cutter-motor support plate 65. The support plate 65 is attached via two brackets 67 to the tines 24 in a fixed relationship to the drive-wheel 14. The adjacent of the cutters, e.g. 53 and 54, produce two circular cutting areas respectively that slightly overlap each other. The cutters are arranged in the cutting plane 57 with respect to the wheel plane 64 so that when the mower vehicle 10 is being propelled in the forward direction indicated by arrow 66, the freshest portion of the wake 68 of cut grass that is produced always remains symmetrical about the drive-wheel plane 64 whatever direction (66) the drive wheel may be steered in.

The drive assembly 12 includes a protective bell-shaped shroud 63 that encloses, inter alia, most of the hinge 20, the drive-wheel base 22, all of the motors 34, 46, 59, 60, 61 and 62, and of course the drive wheel 14 itself. With reference to FIG. 1 and the detail drawing in FIG. 3, the shroud 63 is connected to and supported near it's top by the main bearing 26 via a tip ring assembly 69.

The tip ring assembly 69 is comprised of a washer-shaped plate 70 that is fixedly mounted to the main bearing 26 by the bead weld 72 and is oriented orthogonally with respect to the axis 27 of the main bearing 26. Tip ring assembly 69 further includes a tip-ring 74, also of washer shape but with a hole 77 of larger diameter than the outside diameter of the main bearing 26. Tip ring 74 is positioned over but not connected to the plate 70. The outer perimeter of the tip ring 74 has a downward turned flange 76 to stop the tip ring from sliding off the plate 70.

The shroud 63 also has an oversized hole 64 at its top through which the main bearing 26 freely passes. The top portion of the shroud 63 is positioned concentrically with both the plate 70 and the tip-ring 74, and is bolted to the tip-ring 74. A plurality of springs 75 are connected between the tip ring flange 76 and points below the tip-ring-assembly support plate 70 of the main bearing 26.

The skirts of the shroud 63 are therefore rendered laterally movable with respect to the drive wheel 14 and is thus deflectable by objects that the vehicle may run into. This shroud-deflectable feature is a safety feature by which the hard shell of shroud 63 is in effect made compliant.

Figure 3:
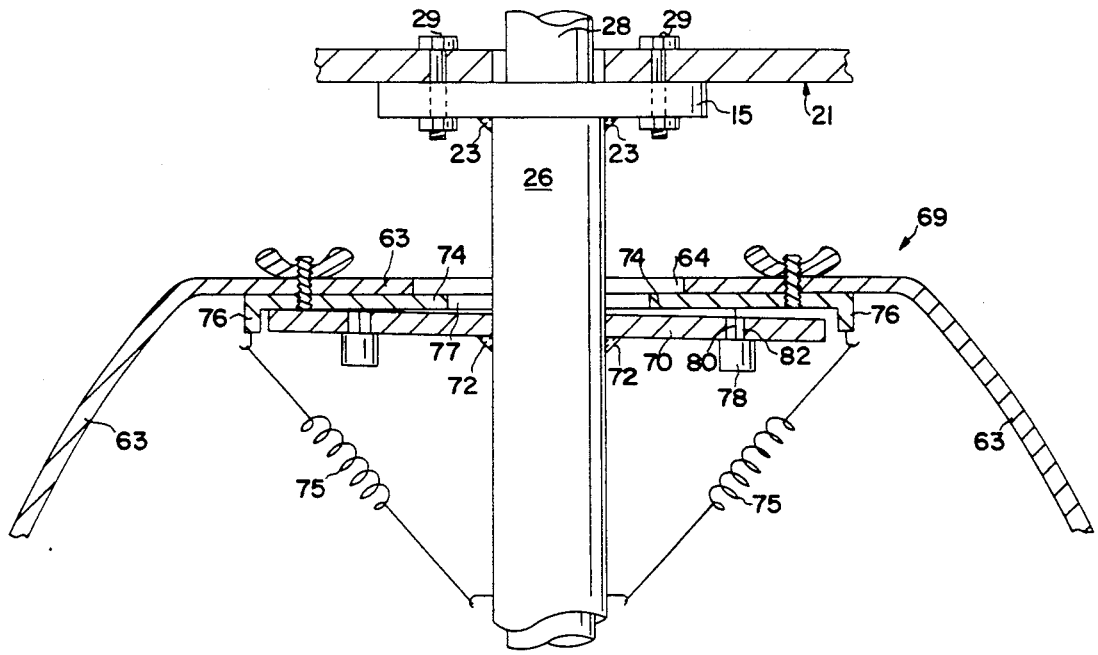
FIG. 3 shows in side sectional view of a detail of the tip ring assembly connector for mounting the shroud to the drive wheel assembly in the mower vehicle of FIG. 1.

But in addition, and as seen in FIG. 3, there are included within the shell of the shroud 63 a plurality of proximity detectors 78 mounted to the plate 70, each having an upwardly spring loaded feeler rod 80 extending through holes 82, respectively, in the tip-ring-assembly support plate 70. When the vehicle 10 runs into an object in the grass to be mowed, the shroud 63 deflects laterally causing the tip ring to lift away from the support plate 70. This causes the feeler rod 80 of a proximity detector 78 to rise and a switch in the detector 78 is opened to break, via a relay 79 (FIG. 4), the circuit through which drive-wheel motor 34 and the cutter motors 59, 60, 61, and 62 are energized. Thus by stopping the vehicle and its grass cutting motors when an object and the mower vehicle 10 collide, both vehicle and object are protected against injury or damage.

The forward velocity of the mower vehicle 10 is made dependant upon the amount of loading experienced by the cutter motors 59, 60, 61 and 62. This is accomplished in the preferred embodiment by the circuit means shown in FIG. 4.

The load current of all of the cutter motors, or alternatively the average load current of all of the cutter motors, but preferably the highest single load current of the DC cutter motors 59, 60, 61 and 62 is converted to a corresponding proportional positive voltage, Vctr, by the current to voltage converter 88. The cutter-load voltage, Vctr, is presented to the positive input of differential amplifier comparator 86.

A positive DC reference voltage Vref is applied to the negative input terminal of the differential amplifier 86. The output voltage of amplifier 86 is thus the amplified difference between Vctr and Vref that is presented to the input of the standard voltage integrator made up of operational amplifier 90, resistor 94 and capacitor 92.

The output of the integrator is presented to one input of a standard voltage comparator 96 of the kind that produces a binary output voltage Vm having a high voltage level $v_1$ during periods when Vi is less than Vt, and having a low voltage level $v_o$ during the other periods when Vi is grater than Vt. The voltage Vt is a periodic voltage having a triangular-waveform produced by the generator 98 and presented at the other input of the comparator 96. The resulting binary voltage Vm thus has a duty factor and corresponding average value, that varies as an inverse function of the magnitude of cutter-motor load current.

The driver amplifier 100 is a standard power transistor switch that turns on when the input voltage to it is high, $v_1$, and turns off when the input voltage is low, $v_o$. The average energizing current that may flow at any given moment through the drive-wheel motor 34 is therefore made an inverse function of cutter-motor load current, which load current is a measure of the physical loading on the cutters. Thus when the grass being cut is especially high or tough, the cutter-motor load current rises, the duty factor and average value of the energizing current to the drive-wheel motor 34 decreases and the mower vehicle 10 slows to a speed at which the speed of the cutter motors picks up to a predetermined normal speed at which cutting efficiency and reliability are optimum.

Figure 4:
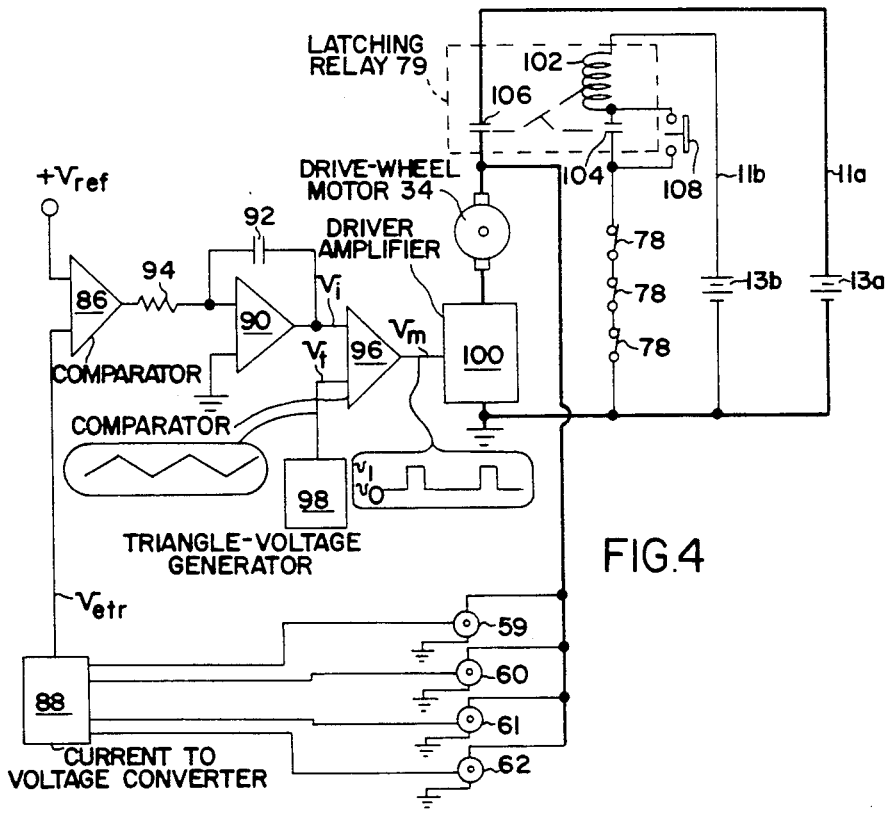
FIG. 4 shows a block diagram of the drive control circuit in the mower vehicle of FIG. 1.

Furthermore with reference to FIG. 4, the above mentioned proximity detectors 78 have their switches connected in series with the cable 11b supplying electrical energy from the battery 13b to the coil 102 of the relay 79.

The relay 79 has one normally open contact 104 connected in series with the relay coil 102. It also has another normally open contact 106 connected in series with the drive-wheel motor 34 and the cutter motors 59, 60, 61 and 62. If any one of the proximity-detector(78) switches opens, e.g. because the mower vehicle 10 has struck an object in its path, then the circuit is opened and the drive motor 34 stops; the cutter motors 59, 60, 61 and 62 also stop. The relay 79 is connected as a self latching relay in the circuit of FIG. 4.

Thus there is connected in parallel with the normally open contact 104 of relay 79 a manually operable momentary type switch 108. This enables starting the current flowing through the coil 102 and after releasing the momentary starting switch 108, the established coil current holds itself on. Thereafter, even momentary opening of a proximity-detector switch 78 will de-energize the relay 79 which will not turn back on until an operator has determined that the cause of the stopping has been removed and the start switch used to restart the mower.

The electrical and electronic circuits described above are packaged and enclosed in the housing 105 that is mounted on the drive-wheel base plate 22. Other circuits (not shown), may also be located in the housing 105, for controlling the operations such as steering, perhaps by radio remote-control or by sensing and following a buried wire, and for providing circuit fusing and other safety features.

In the circuit of FIG. 4, one battery 13a energizes the heavier loads i.e. drive-wheel motor 34 and the cutter motors 59 through 62. A separate battery 13b via separate conductor 11b becomes the source of energy for the electrical and electronic control circuits to provide more noise free better regulated power for the control circuits. However in principal, one battery could be used alone for both purposes.

What is claimed is:
1. A mower vehicle comprising:
a drive-wheel assembly;
a trailing sulky;
a hinge with a normally vertical axis and with two hingedly connected parts hingedly connecting said trailing sulky to said drive-wheel assembly,
said drive-wheel assembly comprising a drive wheel for standing on the ground and supporting said drive-wheel assembly; a drive-wheel base member fixedly attached to one part of said hinge, the other of said hinge parts being fixedly attached to an end of said sulky, a drive wheel rotatably mounted in a vertical plane to said drive-wheel base member in a position directly underneath said hinge; a drive-wheel motor fixedly mounted to said drive-wheel base member, said drive-wheel motor having a drive-shaft turnably coupled to said drive wheel for turning said drive wheel relative to said drive-wheel base member and propelling said mower vehicle when said drive-wheel motor is energized; and grass cutting means connected to said base member and positioned adjacent to said drive wheel for cutting the grass just above the supporting ground;
a steering-motor connection means including a steering motor having a body and a drive shaft connected between said one hinge part and said another hinge part, for activating said hinge and turning said drive-wheel assembly with respect to said sulky;
an electrical energy source housed in said sulky; and
electrical means for making an electrical connection between said energy source and said drive-wheel motor to energize said drive-wheel motor.

2. The mower vehicle of claim 1 wherein said body of said steering motor is fixedly mounted to said drive-wheel base member, and said steering-motor drive shaft is turnably coupled to said another hinge part.

3. The mower vehicle of claim 1 wherein said one hinge part is a cylindrical bearing and said another hinge part is a post inserted in said cylindrical bearing.

4. The mower vehicle of claim 1 wherein said grass cutting means is comprised of a cutter support plate, a plurality of cutters rotatably mounted to said support plate for rotating and cutting in a substantially horizontal cutting plane between said cutter support plate and the ground.

5. The mower vehicle of claim 4 wherein said cutting means is comprised of a plurality of cutter motors mounted to said cutter support plate, said cutter motors having drive shafts positioned vertically and extending below said cutter support plate, and said plurality of cutters mounted, respectively, to said shafts of said plurality of cutter motors below said support plate.

6. The mower vehicle of claim 5 wherein said electrical means is additionally connected to at least one of said cutter motors for sensing the load current in said at least one cutter motor, said electrical means being additionally for adjusting the speed of said drive wheel inversely with the load current of said at least one cutter motor, so that the velocity of said mower vehicle decreases when the physical cutting load on said at least one cutter motor increases.

7. The mower vehicle of claim 4 wherein said drive wheel has an axle by which said drive wheel is rotatably mounted to said base member, two of said cutters being the laterally outermost cutters, namely being centered in the vertical plane of said drive-wheel axle and being equidistant from and on opposite sides of said drive wheel, the other cutters lying closer to said drive-wheel, so that in whatever straight or turning direction said mower vehicle is moving, the wake of cutting left behind said vehicle symmetrically follows the path of said drive wheel.

8. The mower vehicle of claim 4 wherein the adjacent of said cutters have an overlapping cutting area.

9. The mower vehicle of claim 1 additionally comprising a thrust bearing mounted to said end of said sulky and receiving a top end of said one hinge part to provide vertical support to said sulky end by said drive-wheel assembly.

10. The mower vehicle of claim 1 additionally comprising a shroud and a tip ring assembly connector means connected between said shroud and said another hinge part, said shroud covering and protecting said drive-wheel assembly, said tip ring assembly means being for mounting said shroud to said another hinge part, for holding said shroud in one vertical position when no force is applied to the outer sides of said shroud, and for permitting said shroud to tip when a force is applied to an outer side of said shroud.

11. The mower vehicle of claim 10 wherein said electrical means is additionally for sensing the tipping of said shroud, for maintaining said electrical connection when said shroud is in said one vertical position and for interrupting said connection when said shroud is tipped more than a predetermined amount from said one position.

12. The mower vehicle of claim 11 wherein said electrical means includes a latching means having a normally open start switch for latching-on by making and maintaining the energizing-connection to said drive-wheel motor when said start switch is momentarily closed; and for, after sensing an instance of tipping of said shroud by said predetermined amount, latching-off said energizing connection to said drive-wheel motor until said start switch is again momentarily closed.

* * * * *